United States Patent Office 3,067,625
Patented Dec. 11, 1962

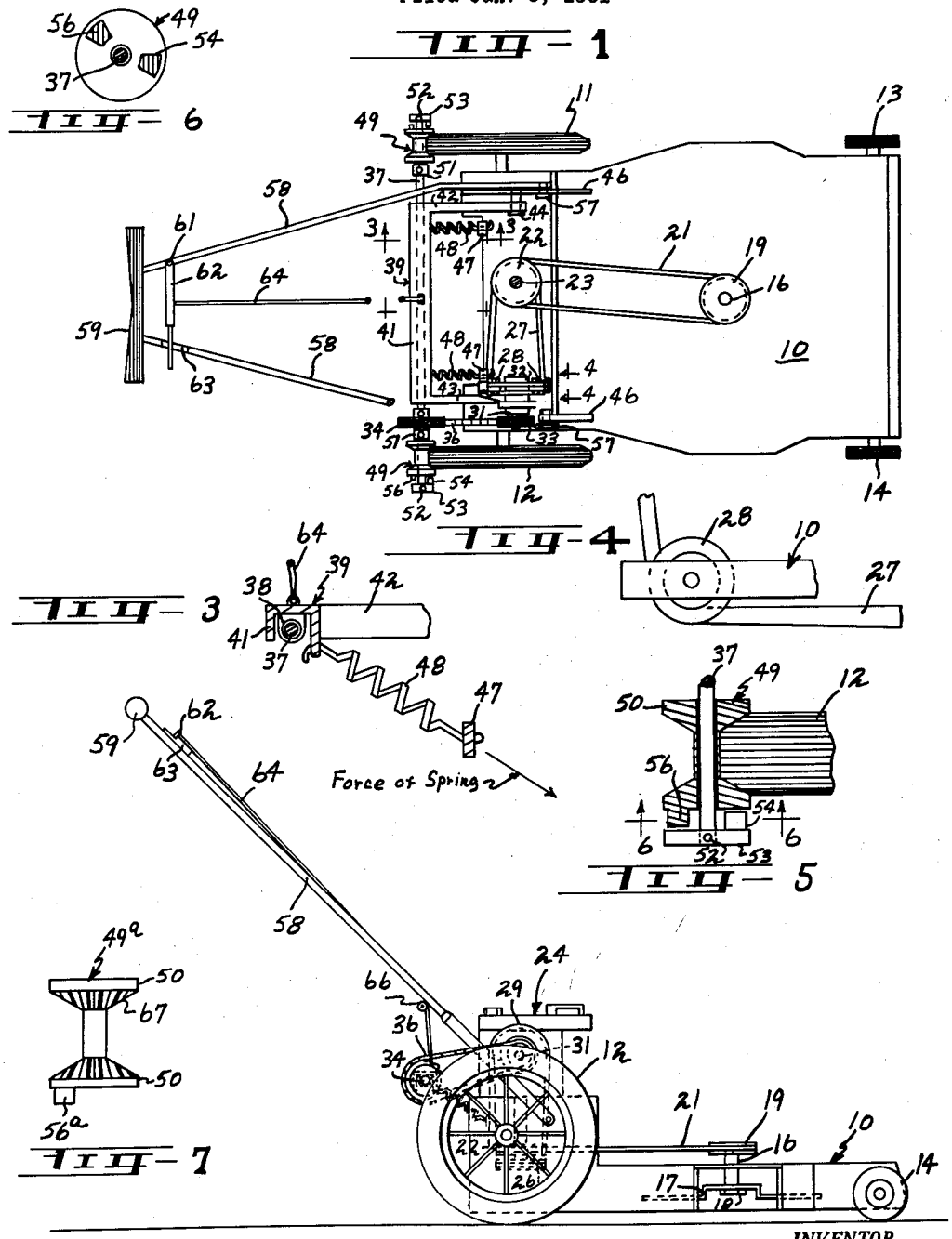

3,067,625
DRIVE ASSEMBLY
William W. Carter and Charlie F. Carter, both of
Rte. 1, Brundidge, Ala.
Filed Jan. 5, 1961, Ser. No. 80,833
4 Claims. (Cl. 74—209)

This invention relates to a drive assembly and more particularly to an assembly for imparting rotary motion from a rotatable driving member to a rotatable ground engaging member whereby a limited amount of independent, relative rotary motion is permitted between the driving member and the ground engaging member, thus permitting the ground engaging member to vary its speed of rotation without changing the speed of rotation of the driving member.

An object of our invention is to provide a drive assembly for imparting rotary motion from a common rotatable driving member to the rotatable ground engaging members of a translatable frame, such as a lawn mower or the like, whereby the speed of rotation of the ground engaging member at one side of the frame may be varied relative to the speed of rotation of a ground engaging member at the other side of the frame, without varying the speed of rotation of the common driving member for the ground engaging members and providing at all times a positive driving grip between at least one ground engaging member and the member which drives the same.

A more specific object of our invention is to provide a drive assembly of the character designated which shall greatly facilitate the steering of translatable frames, such as lawn mowers and the like.

A further object of our invention is to provide a drive assembly of the character designated which shall be simple of construction, economical of manufacture and one which may be readily applied to conventional type lawn mowers and the like.

Heretofore in the art to which our invention relates, various drive assemblies have been devised for translatable frames, such as lawn mowers and the like. Some drive assemblies propel the translatable frame by engaging a driving member with one wheel only of the frame. Where both wheels of the translatable frame are engaged by a driving member in the usual manner, the translatable frame is very difficult to steer. That is, as the frame goes around a curve, the wheel at the outside of the curve must rotate at an increased speed relative to the speed of rotation of the wheel at the inside of the curve. Accordingly, where a common drive is provided for the wheels at both sides of the translatable frame in the usual manner, both wheels rotate at the same speed and the speed of rotation thereof cannot be varied except by the slippage between the driving member and the driven member. This not only makes steering more difficult, but also consumes more power and increases greatly the friction between the rotating members whereby there is rapid wear of the drive assembly.

To overcome the above and other difficulties, we provide a common drive for the wheels at both sides of a translatable frame and include improved means in the drive assembly which permits a limited amount of relative rotation between each wheel and the common drive, whereby the rotation of one wheel may advance a predetermined angular distance relative to the rotation of the other wheel without varying the speed of rotation of the common drive.

Drive assemblies illustrating features of our invention are shown in the accompanying drawing, forming a part of this application, in which:

FIG. 1 is a top plan view showing our improved drive assembly associated with a lawn mower, and partly broken away and in section with certain parts being omitted for the sake of clarity;

FIG. 2 is a side elevational view;

FIG. 3 is a sectional view taken generally along the line 3—3 of FIG. 1;

FIG. 4 is an enlarged, fragmental view taken generally along the line 4—4 of FIG. 1;

FIG. 5 is an enlarged, fragmental view, partly in section showing the drive assembly;

FIG. 6 is a sectional view taken generally along the line 6—6 of FIG. 5; and,

FIG. 7 is a top plan view showing a modified form of our invention in which deformations are formed in the outer surface of one of the driving elements.

Referring now to the drawing for a better understanding of our invention, we show a translatable frame in the form of a lawn mower 10 having a pair of drive wheels 11 and 12 at the rear thereof. The forward end of the frame is supported by suitable wheels 13 and 14. The mower is provided with a vertical drive shaft 16 having a cutting blade 17 mounted at the lower end thereof by a suitable retaining nut 18. A drive pulley 19 is mounted at the upper end of the vertical shaft 16, as shown in FIGS. 1 and 2. The pulley 19 is driven by a belt 21 which passes around the pulley 19 and a pulley 22 mounted on a drive shaft 23 of an internal combustion engine indicated generally at 24. In FIG. 1, the internal combustion engine 24 is omitted for the sake of clarity.

Mounted on the drive shaft 23 beneath the pulley 22 is a drive pulley 26, as shown in FIG. 2. Passing around the drive pulley 26 is a belt 27 which passes beneath a pair of guide rollers 28 and then upwardly over a pulley 29 which is keyed to a horizontal shaft 31. As shown in FIG. 1, the shaft 31 is mounted for rotation in suitable bearings indicated generally at 32. Keyed to the shaft 31 is a sprocket wheel 33 which is operatively connected to a sprocket wheel 34 by a sprocket chain 36.

The sprocket wheel 34 is keyed to a shaft 37 which extends transversely of the frame 10 and rearwardly of the drive wheels 11 and 12, as shown. The shaft 37 is supported by suitable bearing members 38 carried in a U-shaped frame 39 having a base portion 41 and forwardly extending leg members 42 and 43. The forward ends of the leg members 42 and 43 are pivotally connected to the frame 10 by suitable pivot members indicated at 44 which are carried by vertically extending plate-members 46. The base portion 41 of the U-shaped frame 39 is connected to lugs 47 carried at the rear of the frame 10 by tension springs 48 which urge the shaft 37 in a direction toward the ground engaging drive wheels 11 and 12.

Mounted for rotation on the shaft 37 adjacent each end thereof in position to engage the drive wheels 11 and 12 are intermediate rotatable members 49. Axial movement of the intermediate members 49 inwardly of the shaft 37 is limited by collars 51 which are keyed to the shaft 37. Each intermediate rotatable member 49 is in the form of a spool-like member having annular flanges 50 at each end thereof. Preferably, the inner surface of the flanges 50 taper inwardly, as shown in FIGS. 1 and 5 to provide beveled surfaces which engage opposite sides of the ground engaging wheels 11 and 12. By providing the annular flanges 50 which engage opposite sides of the wheels 11 and 12 a much better grip is obtained between the rotatable member 49 and the wheels. That is, the beveled flanges 50 define a generally V-shaped groove as viewed in cross section, which is disposed to receive the ground engaging wheel, as shown in FIG. 5.

Keyed to the shaft 37 adjacent the intermediate rotatable members 49, by set screws 52 are collars 53. Formed integrally with and projecting inwardly of each of the collars 53 is an abutment or stop member 54. Also formed integrally with each intermediate rotary member 49 and projecting outwardly thereof is an abutment or stop member 56 which is adapted to be engaged by the stop member 54 upon relative rotation of the collar 53 and the intermediate member 49. That is, as the shaft 37 is rotated, the stop member 54 engages the stop member 56 whereby the intermediate member 49 rotates with the shaft 37. In view of the fact that the shaft 37 and the intermediate member 49 are adapted for a limited amount of angular rotation relative to each other, either of the ground engaging wheels 10 and 11 may be rotated independently of the driving assembly at a faster rate of rotation than the other wheel for a predetermined angular distance which is determined by the angular movement of the stop members 54 and 56 relative to each other.

Pivotally connected to the translatable frame 10 by suitable pivot pins 57 are suitable handle members 58 which extend rearwardly and upwardly from the frame, as shown in FIG. 2. An operating handle 59 is mounted at the upper ends of the handle members 58, as shown. Pivotally mounted on one of the handle members 58 by a pivot pin 61 is a lever 62 which is disposed to engage a suitable latch 63 whereby the lever 62 is held in selected positions. The upper end of a flexible member 64 is secured to the lever 62 while the other or lower end thereof is secured to the base member 41 of the U-shaped frame 39. Preferably, the flexible member 64 passes over a sheave member 66 which is carried by the handle members 58 whereby the flexible member 64 is held in parallel relation to the handle members 58 until it passes over the sheave 66. Upon movement of the lever 62 toward the handle 59, or in a clockwise direction, as viewed in FIG. 1, the flexible member 64 pulls the U-shaped frame outwardly and upwardly to overcome the pressure exerted by the springs 48 whereby the shaft 37 and the intermediate rotary members 49 carried thereby are moved out of engagement with the ground engaging wheels 11 and 12. Accordingly, by lifting the lever 62, the intermediate rotary members 49 are out of driving engagement with the ground engaging wheels 11 and 12. Upon moving the lever 62 away from the handle 59, or in a counterclockwise direction, as viewed in FIG. 1, the flexible member 64 is lowered whereby the springs 48 urge the intermediate rotary members 49 into driving engagement with the ground engaging wheels 11 and 12.

In FIG. 7 of the drawing, we show an intermediate rotary member 49a having an outwardly projecting stop member 56a thereon. The intermediate rotary member 49a is identical to the intermediate rotary member 49 with the exception that deformations 67 are provided along the inner beveled surface of the annular flanges 50 whereby a better gripping action is obtained between the intermediate rotary member and the ground engaging wheel associated therewith. Preferably, the deformations extend outwardly in a generally radial direction, as shown in FIG. 7.

From the foregoing description, the operation of our improved drive assembly will be readily understood. To drive the ground engaging wheels 11 and 12, the lever 62 is pivoted about its pivot point 61 in a counterclockwise direction, as viewed in FIG. 1, whereby the flexible member 64 and the U-shaped frame 39 are lowered to thereby move the shaft 37 and the intermediate rotary members 49 toward the ground engaging wheels. Upon engagement of the intermediate rotary members 49 with the ground engaging wheels, the translatable frame 10 is propelled forwardly. For example, to rotate the intermediate rotary member 49 in a direction to drive the wheel 12 in a direction to propel the frame 10 forward, the stop member 54 associated therewith rotates in a counterclockwise direction, as viewed in FIG. 6, whereby it engages stop member 56 carried by the intermediate rotary members 49. Upon continued rotation of the shaft 37 and the stop member 54, the intermediate rotary member 49 is rotated.

As long as the translatable frame 10 is moving in a straight line, the stop members 54 at both sides of the frame 10 remain in contact with their associated stop members 56 whereby continuous drive is imparted to the wheels 11 and 12. However, upon moving the handle 59 in a direction to cause the frame 10 to turn toward the left or right, as the case may be, the stop member 54 associated with the intermediate rotary member on the inside of the turn being made remains in contact with its associated stop member 56 while the turn is being made. The stop members 54 and 56 associated with the wheel at the outside of the turn being made do not remain in contact with each other due to the fact that the ground engaging wheel 11 or 12, as the case may be, on the outside of the turn being made must rotate at a greater speed than the wheel on the inside of the turn. Accordingly, the ground engaging wheel at the outside of the turn rotates its intermediate rotary member 49 as the turn is being made whereby the stop member 56 carried thereby rotates faster than the stop member 54 whereby it advances or moves in an angular direction away from the stop member 54. That is, the stop member 56 moves in a counterclockwise direction, as viewed in FIG. 6, away from the stop member 54.

This relative angular movement between the stop members 56 and 54 is limited by engagement of the stop member 56 with the stop member 54 as it continues to move in an angular direction relative to the stop member 54. It will thus be seen that the ground engaging member 11 or 12, as the case may be, at the outside of a turn being made is free to move forwardly at a greater speed than the ground engaging member at the inside of the turn without interfering with the continuous drive connection between the intermediate rotary member 49 and the ground engaging member at the inside of the turn being made. Accordingly, the translatable frame may be readily turned in either direction without disengaging or causing either of the intermediate rotary members to slip relative to its associated ground engaging wheel. Also, since the stop members 54 and 56 associated with the drive assembly at the inside of the turn being made remain in contact with each other, a positive drive is maintained for propelling the translatable frame 10 forwardly at all times.

From the foregoing, it will be seen that we have devised an improved drive assembly for translatable frames, such as mowers and the like, which permits free and easy steering of the translatable frame without interrupting the positive drive between the power means and the ground engaging wheels. By eliminating the necessity of having to disengage the drive means from the ground engaging wheels when a turn is being made and at the same time preventing slippage between the driving element and the driven element, our improved apparatus is trouble-free in operation and frictional wear between the driving elements is reduced to a minimum.

While we have shown our invention in two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What we claim is:

1. A drive assembly for imparting rotary motion from a rotatable driving member to a rotatable ground engaging member comprising an intermediate member mounted on said driving member for free rotation relative thereto and frictionally engaging said ground engaging member, and cooperating stop members carried by said driving member and said intermediate member disposed to engage each other upon a predetermined amount of relative rotation between said driving member and said intermediate member to provide a positive drive between said driving member and said intermediate member and to limit the amount of free relative rotation between said driving member and said intermediate member.

2. A drive assembly for imparting rotary motion from a rotatable shaft to at least two laterally spaced rotatable ground engaging members comprising intermediate members mounted on said shaft for free rotation relative thereto in position to engage the periphery of each of said ground engaging members, a stop member carried by each of said intermediate members, and stop members carried by said shaft in position to engage the stop members carried by said intermediate members upon a predetermined amount of relative rotation between said shaft and said intermediate members to provide a positive drive between said shaft and said intermediate member and to limit the amount of free relative rotation between said shaft and said intermediate stop members whereby one intermediate member is adapted for a limited amount of free rotation relative to the other intermediate member.

3. A drive assembly for imparting rotary motion from a rotatable shaft to a pair of rotatable ground engaging members as defined in claim 2 in which means is provided for urging the shaft toward said ground engaging members.

4. A drive assembly for imparting rotary motion from a rotatable shaft to a pair of rotatable ground engaging members as defined in claim 3 in which the means for urging the shaft toward the ground engaging members comprise spring members.

References Cited in the file of this patent

UNITED STATES PATENTS

| 644,440 | McElroy | Feb. 27, 1900 |
| 2,679,761 | Pedersen | June 1, 1954 |
| 2,771,959 | Phelps | Nov. 27, 1956 |

FOREIGN PATENTS

| 946,024 | Germany | July 19, 1956 |